United States Patent
Parodi fu Leonardo et al.

[15] 3,644,943
[45] Feb. 29, 1972

[54] DEVICE FOR CLEARING BLOCKAGES IN THE OUTLETS OF SINKS, BATHS OR THE LIKE

[72] Inventors: Giuseppe Parodi fu Leonardo; Giuseppe Perodi di Francesco, both of 5/2 Via Benedetto da Cesino, Genoa, Italy

[22] Filed: Dec. 31, 1968

[21] Appl. No.: 788,301

[30] Foreign Application Priority Data

Jan. 4, 1968 Italy..............................829,420

[52] U.S. Cl.................................................4/255
[51] Int. Cl........................................E03d 5/09
[58] Field of Search...............15/104.03, 104.05, 104.3; 4/255

[56] References Cited
UNITED STATES PATENTS

1,304,196  5/1919  Noppel.........................4/255
2,406,317  8/1946  Bonde...........................4/255
2,607,927  8/1952  Scott............................4/255

*Primary Examiner*—Edward L. Roberts
*Attorney*—Irving M. Weiner

[57] ABSTRACT

A device for clearing blockages in the outlets of sinks, baths or the like comprises an elastomeric cup to the base of which is fixed a reciprocable handle. An annular pressing member engages the cup adjacent the rim and acts between the rim and the base of the cup or between the rim and the handle to bias the cup to its expanded condition so that in use the rim is held in engagement with the bottom of the bath or the like as the handle is reciprocated.

2 Claims, 8 Drawing Figures

Patented Feb. 29, 1972  3,644,943
2 Sheets-Sheet 1
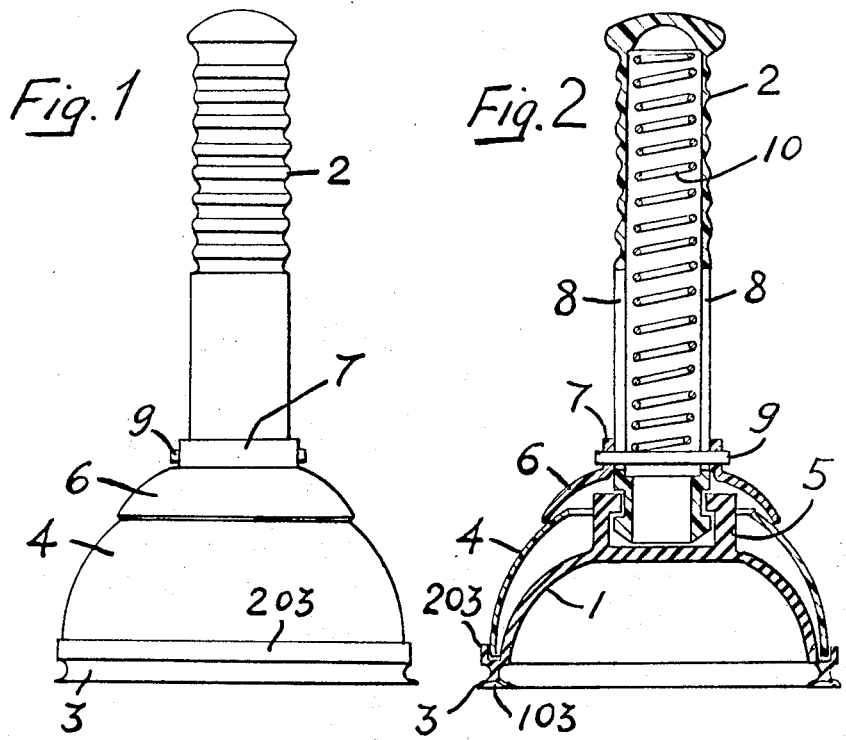
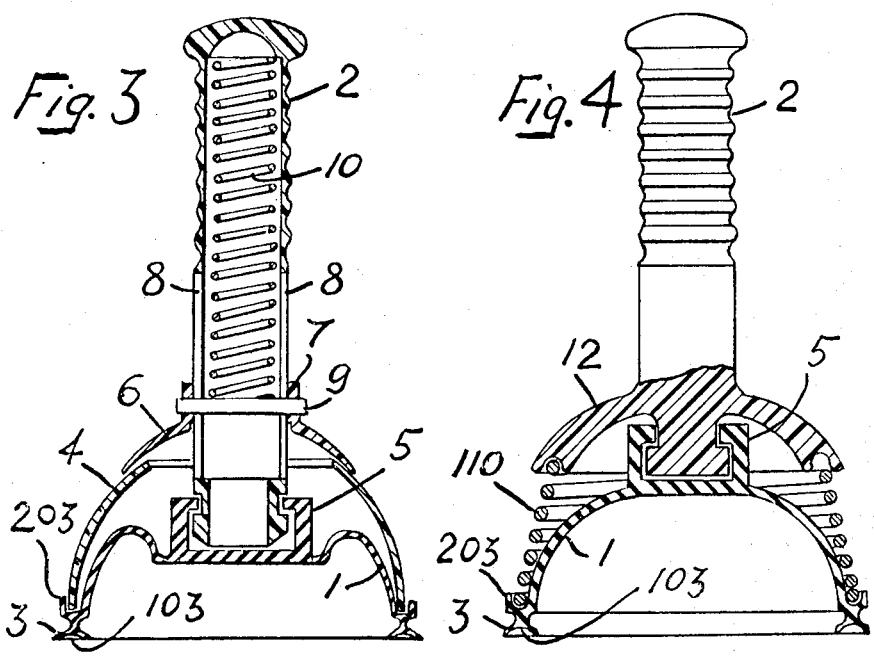

DEVICE FOR CLEARING BLOCKAGES IN THE OUTLETS OF SINKS, BATHS OR THE LIKE

The invention relates to a device for clearing blockages in the outlets of sinks, baths or the like, of the kind having a reciprocable operating handle and, secured thereto, an elastomeric cup-shaped member.

To use a device of this kind the elastomeric cup-shaped member is placed over the orifice of a blocked sink or bath outlet and pressed against the bottom of the sink or bath, whereafter the operating handle is reciprocated vertically to alternately compress the cup-shaped member downwards and stretch it upwards, so that a positive pressure alternating with a negative pressure is produced in the outlet pipe. So that the cup-shaped member can be disengaged from the bottom of the bath or sink, and so that external air or external water is not sucked in when the handle is moved upwards and compressed air or water does not escape from the cup-shaped member between the same and the bottom of the sink or bath when the handle is pressed down, means are provided which press the rim of the cup-shaped member over its whole periphery against the bottom of the sink or bath into sealing-tight engagement therewith.

In known devices of this kind the means for pressing the rim of the cup-shaped member takes the form of a rigid annular pressing member which can be depressed by a second holddown grip or handle separate and independent of the operating handle. A disadvantage of this construction is that both hands must be used to operate the device, and this cannot always be done or at any rate is often difficult for reasons of space.

It is an object of the invention to provide a device of this kind specified which has an annular pressing member for the rim and which can be operated with one hand.

To this end, according to the invention, a resilient member is provided acting between the operating handle and the annular pressing member. A device constructed in this way has a single reciprocable operating handle and can therefore be operated with one hand, firm and reliable contact between the bottom of the sink or bath and the rim of the cup-shaped member being ensured by the resilient member which is compressed and stretched as the operating handle is reciprocated.

The resilient member can be constructed and arranged in a variety of ways. Very conveniently, the resilient member is a helical spring.

Some embodiments of the invention are diagrammatically illustrated in the drawings wherein:

FIG. 1 is a view in side elevation of a first embodiment of the invention;

FIG. 2 is a view in vertical longitudinal section of the device shown in FIG. 1, in the inoperative position;

FIG. 3 is a view similar to FIG. 1 except that the cup-shaped member is in the compressed position;

FIG. 4 is a view partly in side elevation and partly in vertical longitudinal section of a second embodiment;

Figure 5:
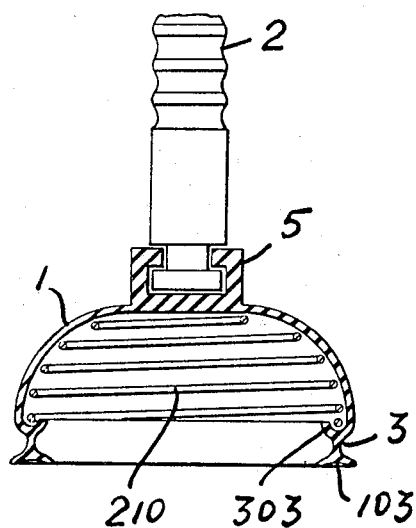
FIG. 5 is a view in vertical longitudinal section of a third embodiment.

The device shown in FIGS. 1-3 is of use for clearing blockages from the outlet pipes of sinks, gutters, baths and the like and includes a cup-shaped member in the form of a suction and compression cup 1 which is part-spherical or hemispherical in shape and which is mounted at the bottom end of an operating grip or handle 2. The cup 1 is made of rubber or an elastomeric plastics material. Handle 2 is hollow and can be made of any rigid substance, such as synthetic plastics.

The cup 1 has a thickened rim 3 having a concave bearing s$rface 103 and an outwardly projecting peripheral bead or shoulder 203 formed with a channel which is open at the top and which is engaged by the bottom edge of a rigid annular pressing member constituted by a lower part 4 of a rigid hemispherical, synthetic plastics, protective hood enclosing the cup 1. The part 4 is formed at the top with a central orifice through which extend the bottom end of the handle 2, and an attachment boss 5, connected to the base of the cup 1, and forming an attachment for the end of the handle.

Disposed on part 4 is a part-spherical thrust plate part 6 of the hood which closes the orifice 4 and has a tubular central portion 7 providing an aperture which is a sliding fit lengthwise on handle 2. The handle has a central longitudinal bore and is formed with two diametrically opposite longitudinal guide slots 8 through which extends a transverse pin 9 secured in the portion 7. A helical compression spring 10 is disposed within the bore in the handle 2 between pin 9 and a closed end of the bore at the top end of handle 2.

When the device is in the inoperative position shown in FIGS. 1 and 2, some initial stressing is preferably given the spring 10 to make the pin 9 bear against the bottom ends of the slots 8, the plate part 6 resting with little or no pressure on the part 4 of the hood. In this state the device is placed over the outlet orifice of a sink or bath or the like so that its cup 1 completely covers the orifice and bears all around it on the bottom of the sink or bath. Handle 2 is then vertically reciprocated so that cup 1 is alternatively compressed and stretched (cf. FIGS. 2 and 3). A pumping action of pressure alternating with suction is therefore produced in the outlet pipe, which loosens, releases and displaces any blockages therein, and thus clears the blocked pipe. Very conveniently, the outlet pipe and, to some extent, the sink or bath too, are filled with water before the clearing operation just described.

When the handle 2 descends, the spring 10 is compressed in the manner shown in FIG. 3. The compressed spring 10 acts via pin 9 and plate part 6 to apply a downward thrust to the part 4 of the rigid hood, which in turns presses the rim 3 of the cup over its whole periphery against the bottom of the sink or bath into sealing-tight engagement therewith. Consequently, the positive pressure which is produced in the cup 1 upon compression thereof cannot lift the bottom cup edge 3 away from the bottom of the sink or bath and escape through the resulting gap. The full pressure therefore acts in the outlet pipe.

When the handle 2 rises, the compressed spring 10 expands, but continues to apply pressure, via pin 9, plate part 6 and part 4 of the hood, to the cup rim 3 until the handle 2 has returned to its top inoperative position shown in FIGS. 1 and 2. Consequently, the rim 3 remains in firm sealing-tight engagement with the bottom of the sink or bath during the rising movement of handle 2, so that air or water is not sucked from outside into the cup 1 as it expands. The suction resulting from expansion of cup 1 is operative in its entirety only in the outlet pipe.

The device can therefore be operated with one hand, and the rim 3 remains in sealing-tight engagement with the particular support surface concerned during the rise as well as the descent of the handle 2. Another advantage of the compression spring 10 is that it boosts the rising movement of handle 2, and because of its expanding action between the rim 3 and the base of the cup, boosts expansion of the compressed cup 1. The handle 2 can therefore be operated like a press-button, for instance, with the flat of the hand, by being alternately depressed and merely released, automatically returning to the initial position (FIGS. 1 and 2) after each depression.

The embodiments shown in FIGS. 4–8 operate in the same way but differ in construction.

In the embodiment shown in FIG. 4, the cup 1 is of similar construction to the cup 1 of the embodiment shown in FIGS. 1–3 but has disposed around it a helical compression spring 110 whose bottom convolution, closed on itself like a ring, engages in a corresponding groove or channel in an outer bead or shoulder 203 adjacent the rim of the cup on the outside thereof, while the top end of the spring 110 bears on a retaining flange or skirt 12 which is either integral with the bottom end of handle 2, as shown or is secured thereto. When the handle moves down and up, the spring 110 is alternately compressed and expanded correspondingly, acting directly on the rim 3 of the cup to press the rim into firm and sealing-tight engagement with the bottom of the sink or bath. In this embodiment, therefore, the rigid annular pressing member, is provided by the bottom convolution of the spring 110.

In the embodiment shown in FIG. 5 a helical compression spring 210 is concealed inside the cup 1 and secured between a peripheral bead or shoulder 103 which is formed with a groove or channel open at the top which receives a closed convolution at the end of the spring 210 constituting the annular pressing member and the base of the cup which is connected via central portion 5 to the handle 2. The base of the cup is rigid enough in the region around portion 5, to be able to withstand the force of spring 210 without appreciable deformation.

Figure 6:
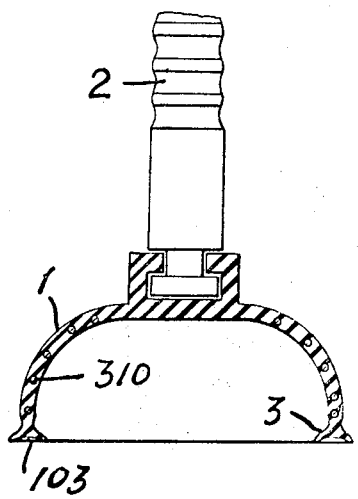
FIG. 6 is a view in vertical longitudinal section of a fourth embodiment.

In the embodiment shown in FIG. 6 a helical spring 310 is embedded in the wall of the rubber or plastics cup 1. Spring 310 is therefore protected against external influences and the cross-sectional shape of the cup adjacent the rim 3 is considerably simplified.

Figure 7:
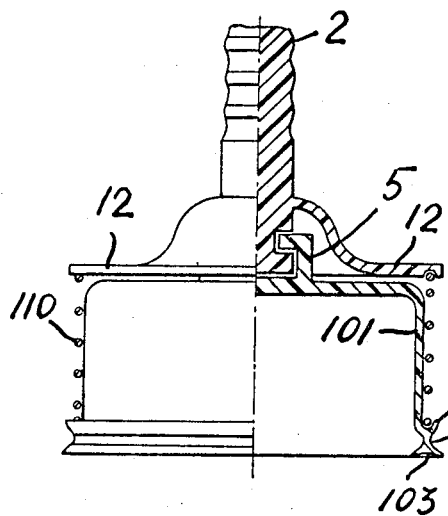
FIG. 7 is a view, half in side elevation and half in longitudinal section, of a fifth embodiment.

Another embodiment, shown in FIG. 7, is basically similar to the embodiment shown in FIG. 4 in that a helical compression spring 110 having a closed convolution at its lower end forming an annular pressing member is disposed around the outside of a suction and compression cup 101 and is secured between an annular projection 203 adjacent the rim 3 and a retaining flange 12 at the bottom end of handle 2. In contrast to the constructions hereinbefore described, however, the cup 1 is not part-spherical or hemispherical but is cylindrical in shape and terminates at the top in a flat horizontal end member. Cups similar to the cup 101 can of course also be used in the embodiments hereinbefore described with reference to FIGS. 1–3, FIG. 5 and FIG. 6.

Figure 8:
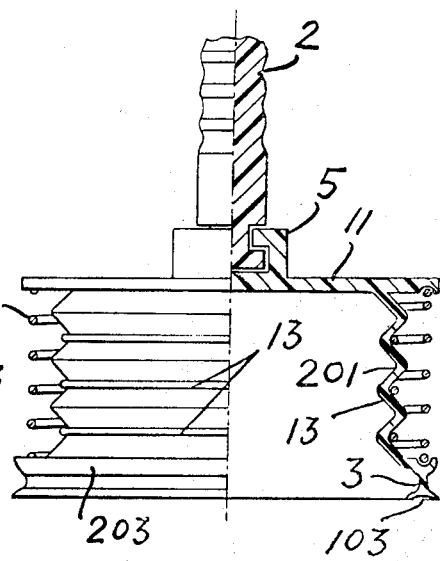
FIG. 8 is a view, half in side elevation and half in longitudinal section of a sixth embodiment.

The embodiment shown in FIG. 8 also has a similar helical compression spring 110 disposed around a suction and compression cup 201, which, however, takes the form of corrugated bellows having a rigid laterally projecting top terminal end 11 and annular metal reinforcements 13 in the bellows. Spring 110 is secured between the laterally projecting edge part of the rigid top closure end 11 and a laterally projecting peripheral shoulder or bead 203 around the lower end of the bellows 201, the shoulder 203 being formed with a channel or groove at the top. Member 11 is integral with bellows 201 which are made of synthetic plastics and is stiffened by having increased thickness and/or special inserts. In this case too the spring 110 can also be disposed inside the bellowslike cup 201 or be embedded in the cup wall. Also, this bellowslike cup 201 can be used with the construction shown in FIGS. 1–3.

We claim:

1. A device for clearing blockages in the outlets of sinks, baths or the like, comprising:
   an elastomeric cup-shaped member having a rim for sealingly engaging the bottom of a sink, bath or the like around the outlet orifice, and a base remote from said rim;
   a reciprocable operating handle attached to said base and extending from the side thereof remote from said rim;
   an annular pressing member engaging the cup-shaped member around said rim for pressing the rim against the bottom of a sink, bath or the like;
   a resilient member arranged to bias the pressing member away from the handle and towards said rim when the handle is pressed towards the rim in use;
   said resilient member including a helical compression spring;
   said pressing member comprises a rigid hood which encloses said cup-shaped member and forms a protective covering therefor, said hood being formed with an aperture and said handle passing through the aperture as a sliding fit, said handle being formed with a central bore closed at its end remote from said cup-shaped member, and with diametrically opposite slots extending through said handle and extending longitudinally of said bore; and
   a pin passing through said slots diametrically across the aperture in the hood and fixed to said hood, said compression spring being accommodated in said bore in the handle between said pin and said closed end.

2. A device for clearing blockages in the outlets of sinks, baths or the like, comprising:
   an elastomeric cup-shaped member having a rim for sealingly engaging the bottom of a sink, bath or the like around the outlet orifice, and a base remote from said rim;
   a reciprocable operating handle attached to said base and extending from the side thereof remote from said rim;
   an annular pressing member engaging the cup-shaped member around said rim for pressing the rim against the bottom of the sink, bath or the like;
   a resilient member arranged to bias the pressing member away from the handle and towards said rim when the handle is pressed towards the rim in use;
   said resilient member including a helical compression spring;
   said pressing member comprises a rigid hood which encloses said cup-shaped member and forms a protective covering therefor, said hood being formed with an aperture and said handle passing through the aperture as a sliding fit, said handle being formed with a central bore closed at its end remote from said cup-shaped member, and with diametrically opposite slots extending through said handle and extending longitudinally of said bore;
   a pin passing through said slots diametrically across the aperture in the hood and fixed to said hood, said compression spring being accommodated in said bore in the handle between said pin and said closed end;
   said cup-shaped member having a lip running around the outside thereof adjacent said rim and provided with a channel directed towards said handle; and
   said hood comprises a first part which engages in said channel and a second part which bears on said pin and which abuts said first part.

* * * * *